United States Patent [19]

Manabe et al.

[11] Patent Number: 5,464,991
[45] Date of Patent: Nov. 7, 1995

[54] NONLINEAR OPTICAL MATERIALS AND THEIR MANUFACTURING METHOD

[75] Inventors: Yoshio Manabe; Ichiro Tanahashi; Tsuneo Mitsuyu, all of Osaka, Japan

[73] Assignee: Matsushita Electric Industrial Co., Ltd., Osaka, Japan

[21] Appl. No.: 332,469

[22] Filed: Oct. 31, 1994

Related U.S. Application Data

[63] Continuation of Ser. No. 685,277, Apr. 12, 1991, abandoned.

[30] Foreign Application Priority Data

Apr. 13, 1990 [JP] Japan ........................................ 2-97973

[51] Int. Cl.$^6$ ................................................. H01L 29/04
[52] U.S. Cl. .................................. 257/53; 257/55; 257/63; 257/103; 257/607
[58] Field of Search ............................ 357/30, 2; 257/63, 257/64, 65, 53, 55, 103, 607, 613

[56] References Cited

U.S. PATENT DOCUMENTS

| | | | |
|---|---|---|---|
| 4,478,654 | 10/1984 | Gau et al. ................................. | 357/30 |
| 4,957,604 | 9/1990 | Steininger ........................... | 204/192.15 |
| 5,017,308 | 5/1991 | Iijima et al. .......................... | 252/501.1 |
| 5,021,103 | 6/1991 | Hamakawa et al. ........................ | 437/3 |
| 5,103,284 | 4/1992 | Ovshinsky et al. ........................ | 257/65 |

*Primary Examiner*—Mark V. Prenty
*Attorney, Agent, or Firm*—Amster, Rothstein & Ebenstein

[57] ABSTRACT

Non-linear optical materials are formed from amorphous thin films having semiconductor microcrystallites dispersed therein. Amorphous thin films of nitrides or carbides are selected that have a larger bandgap than the bandgap of the semiconductor materials which form the dispersed microcrystallites in order to prevent the surfaces of the microcrystallites from undergoing chemical reactions such as oxidation and the like. The non-linear optical materials are prepared by a sputtering method in which a target formed from the semiconductor material and a separate target formed from the nitrides or carbides are sputtered to produce the non-linear optical material.

8 Claims, 1 Drawing Sheet

NONLINEAR OPTICAL MATERIALS AND THEIR MANUFACTURING METHOD

This is a continuation of application Ser. No. 07/685,277 filed on Apr. 12, 1991 now abandoned.

BACKGROUND OF THE INVENTION

This invention is directed to new nonlinear optical materials which may be used in optical devices, such as optical bistable devices which make use of nonlinear optical effects, and to methods for manufacturing these new materials.

Many nonlinear optical materials are known in the prior art. One class of such materials consists of semiconductor-doped glasses. For example, an optical cut-off filter fabricated from borosilicate crown glass doped with $CdS_xSe_{1-x}$ has been shown to exhibit nonlinear optical properties. This filter was described in an article in The Journal Of The Optical Society Of America, Vol. 73, p. 647, published in 1983. The cut-off filter was manufactured by melting both $CdS_xSe_{1-x}$ and a borosilicate glass material in a platinum crucible at a temperature of 1600° C.

Another known nonlinear optical material consists of a glass thin film doped with CdS microcrystallites. This material was disclosed in The Journal of Applied Physics Vol. 63, p. 957, published in 1988. This thin film nonlinear material is deposited in a high-frequency magnetron sputtering apparatus, wherein a disc of 7059 glass (manufactured by Corning Glass Co.) and CdS powder are used as a composite sputtering target. During the sputter deposition process, about 2 to 4% by weight of CdS is diffused into the 7059 glass. However, the prior art manufacture of nonlinear materials in which optical glasses are doped with semiconductor materials has a number of major drawbacks.

For example, in the melting method used to fabricate the prior art cut-off filter material, $CdS_xSe_{1-x}$ and borosilicate glass material are melted together in a platinum crucible heated to a temperature of more than 1600° C. At that high temperature, undesirable chemical reactions can occur. For example, the surface of the microcrystallites which form from the $CdS_xSe_{1-x}$ semiconductor material may be oxidized upon reaction with residual gases in the reaction chamber or with the oxygen in the borosilicate glass. These deleterious reactions make control of the semiconductor composition highly difficult. Furthermore, with the melting method, it is also difficult to uniformly dope the borosilicate glass with the $CdS_xSe_{1-x}$ semiconductor by more than 2 to 4 weight %.

If a sputtering method is used to manufacture an oxide-based glass thin film doped with semiconductor microcrystallites, as in the second example of prior art, the surface of the semiconductor will tend to oxidize during the sputtering process by reaction with the oxide glass. Moreover, the sputtering process is disadvantageous when a thick $SiO_2$ glass film having a low sputtering rate has to be manufactured.

SUMMARY OF THE INVENTION

It is an object of the present invention to solve the above-mentioned problems by providing new nonlinear optical materials and methods for manufacturing these materials. In accordance with the invention, high quality nonlinear optical materials can be obtained wherein an amorphous thin film is doped with semiconductor microcrystallites uniformly dispersed therein.

It is another object of this invention to provide semiconductor-doped nonlinear optical materials in which the semiconductor composition of these materials can be precisely controlled without undesirable chemical reactions occurring during deposition.

It is still another object of this invention to provide semiconductor-doped nonlinear optical materials in which the doping concentration of the semiconductor may be increased beyond that attainable in the prior art.

The above and other desirable objects are satisfied by a doped amorphous nitride-based thin film, such as boron nitride, aluminum nitride, titanium nitride, and silicon nitride; or a doped amorphous carbide-based thin film, such as boron carbide, titanium carbide, and silicon carbide, wherein the dopant comprises a semiconductor dispersed in the form of microcrystallites wherein the surfaces of the semiconductor microcrystallites do not exhibit chemical changes such as oxidation and the like. As disclosed more fully below, these amorphous nitride or carbide thin films have an optical band gap that is larger than the optical band gap of the semiconductor microcrystallites dispersed therein and facilitate the dispersion of the semiconductor microcrystallites. As a consequence, the surfaces of the semiconductor microcrystallites dispersed in these amorphous thin films are free of oxidation.

Amorphous nitride and carbide-based thin films used as the matrix for incorporating the semiconductor microcrystallites have an advantage over prior art oxide-based amorphous matrices in that they generally permit higher diffusion coefficients and higher concentrations for the dopant semiconductor materials.

The semiconductor microcrystallite material which is dispersed into the amorphous thin film material may be chosen from the group I–VII metal chlorides (e.g. CuCl); group II–VI compound semiconductors such as CdS, CdSe, CdO, CdTe, ZnSe, ZnO, ZnTe, HgTe, CdSSe, HgCdTe; group III–V compound semiconductors such as GaAs, GaN, GaP, GaSb, InAs, InP, InSb, GaAlAs, InAlAs; or Group IV semiconductors such as Si and Ge.

Since it is difficult for reactions to be promoted between the above-mentioned amorphous and semiconductor materials, oxidation or other deleterious reactions of the semiconductor microcrystallite surfaces are eliminated when the semiconductor materials are dispersed into the amorphous thin film matrix.

Nonlinear optical materials consisting of a nitride or carbide-based amorphous thin film material doped with microcrystallites of semiconductor can be deposited by a sputtering method employing separate targets of amorphous thin film material and semiconductor microcrystallite material. Using sputtering, the semiconductor microcrystallites can be reproducibly dispersed into the amorphous thin film at a high doping density and with excellent uniformity.

BRIEF DESCRIPTION OF THE DRAWINGS

The advantages of the present invention will become more apparent from the following more detailed description of preferred, but nonetheless illustrative embodiments of the invention, as illustrated by the accompanying drawings wherein.

DETAILED DESCRIPTION OF THE INVENTION

The non-linear materials and devices of the present invention are comprised of a non-oxide based amorphous thin film matrix that is doped with semiconductor microcrystallites. In a preferred embodiment of the invention, the amorphous thin film matrix may be either nitride-based (e.g. boron nitride, aluminum nitride, titanium nitride and silicon nitride) or carbide-based (e.g. boron carbide, titanium carbide and silicon carbide).

Various semiconductor materials may be chosen as the dopant. These semiconductor materials may include Group I–VII metal halides or Group II–VI compound semiconductors such as CdS, CdSe, CdO, CdTe, ZnSe, ZnO, ZnTe, HgTe, CdSSe, and HgCdTe. Group III–V compound semiconductors such as GaAs, GaN, GaP, GaSb, InAs, InP, InSb, GaAlAs, and InAlAs or the more traditional Group IV semiconductors such as Si or Ge may also be used as dopants to form the non-linear optical materials disclosed herein.

The thin film non-linear optical material may be deposited to a thickness of approximately 20–30 microns on a transparent substrate by using the deposition process disclosed below. During deposition, the semiconductor is simultaneously doped into the growing amorphous thin film. To obtain good non-linear characteristics, the dopant semiconductor should be uniformly dispersed within the amorphous thin-film material as small microcrystallites of about 50 nanometers in size.

The interface between the microcrystallites and the non-oxide amorphous thin film permits quantum-well effects to be manifested, which lead to bistable optical characteristics. Experimental verification of the existence of dispersed quantum-well structures is evidenced by a blue shift in the optical absorption spectrum of the doped thin film material. In the preferred embodiment, the non-oxide amorphous thin film is heavily doped with the semiconductor microscrystallites, so that the semiconductor is incorporated to approximately 20 or more weight % of the non-linear optical material.

The non-linear optical materials of this invention may be prepared by the techniques disclosed in the following specific embodiments.

Embodiment 1

Figure 1:
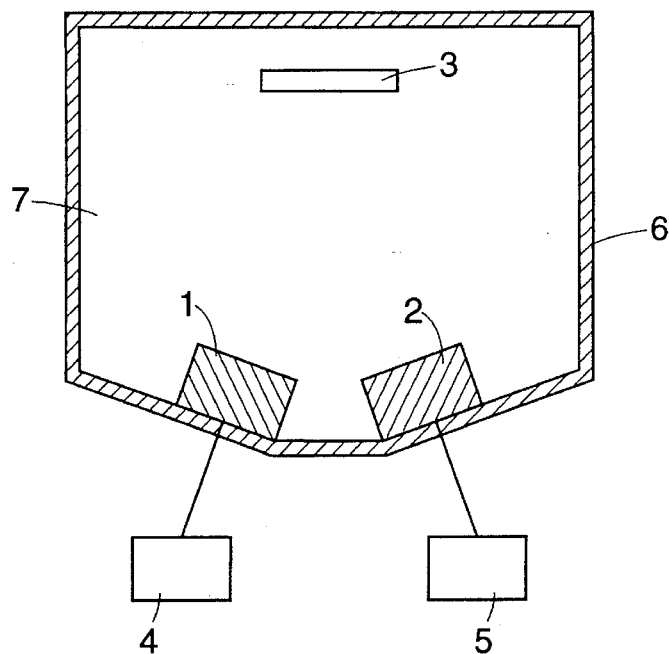
FIG. 1 shows a block diagram of a sputtering apparatus used to manufacture the nonlinear optical materials of the invention.

A block diagram of a sputtering apparatus employed to manufacture the nonlinear optical materials of the invention is shown in FIG. 1, wherein a sputtering chamber 6 has included therein a sputtering target 1 formed from a selected semiconductor to provide dopant material which forms the semiconductor microcrystallite and a sputtering target 2 formed from a nitride-based glass to provide a source of the amorphous thin film matrix material. High-frequency power sources 4 and 5 are respectively applied to targets 1 and 2 to cause material to be sputtered from targets 1 and 2. The sputtered material deposits on substrate 3.

By using this sputtering apparatus, experiments have been conducted for the case where microcrystallites of the II–VI compound semiconductor $CdS_xSe_{1-x}$ (with x=0.1), or alternatively the metal chloride CuCl, have each been separately codeposited with silicon nitride onto a quartz glass substrate to form a nonlinear optical device.

Sputtering was conducted with the sputtering chamber filled with a rare gas 7, e.g. argon gas, at a pressure of 5 Pa, by applying a high-frequency power of 20 watts to the target 1 (CuCl or $CdS_xSe_{1-x}$) and 250 watts to the target 2 (silicon nitride). In this manner, a 30 micron thick thin film doped with semiconductor microcrystallites was formed on a 0.5 mm thick quartz substrate 3.

The substrate 3 was thereafter heated for one hour at 300° C. in an electric furnace to enhance the crystal growth of the respective semiconductor microcrystallites of either CuCl or $CdS_xSe_{1-x}$. The with content of CuCl in the amorphous silicon nitride thin film was found to be 20 weight % and the size of the CuCl microcrystallites was measured to be in the range of 4 to 6 nm after this heat treatment. The content of $CdS_xSe_{1-x}$ in the amorphous silicon nitride thin film was found to be 18 weight %, with the size of the $CdS_xSe_{1-x}$ microcrystallites in the range of 5 to 9 nm.

The optical bandgap of undoped silicon nitride is 4.5 eV (based upon its optical absorption spectrum). The optical bandgap of the above-mentioned CuCl and $CdS_xSe_{1-x}$ semiconductor materials, when deposited as thin films, are 3.2 eV and 2.46 eV respectively. These values are nearly equal to the bandgaps of their respective bulk semiconductor materials. Thus, as evident, the optical bandgap of the undoped silicon nitride is larger than that of CuCl or $CdS_xSe_{1-x}$. However, the bandgaps (as derived from absorption spectra) of silicon nitride films doped with CuCl or $CdS_xSe_{1-x}$ semiconductor microcrystallites were found to be blueshifted by 0.5 and 0.4 eV respectively, i.e. to 3.7 eV for the CuCl doped silicon nitride and 2.86 eV for the $CdS_xSe_{1-x}$ doped silicon nitride. This blue shift is indicative that the semiconductor microcrystallites dispersed in these materials are in the form of three-dimensional quantum wells (or quantum dots), the presence of which indicates the existence of bistable optical characteristics in these materials.

Embodiment 2

Silicon nitride amorphous thin film was deposited on the substrate 3 by utilizing the reaction between a silicon target 2 and nitrogen gas introduced into the sputtering chamber 6. Semiconductor microcrystallites were simultaneously doped therein by sputtering target 1 to form a doped silicon nitride amorphous thin film.

In this second embodiment, the sputtering gas is a mixture of nitrogen gas and argon gas with the magnitude of the gas pressure respectively maintained at 3 Pa and 2 Pa during the sputtering process. Metal chloride CuCl or the II–VI compound semiconductor $CdS_xSe_{1-x}$ (x=0.1) were alternatively used as the material of semiconductor target 1. A high-frequency power of 40 watts was applied to the semiconductor target 1 and a highfrequency power of 100 watts was applied the silicon target 2 to form a 20 micron thick thin film doped with semiconductor microcrystallites on a 0.5 mm thick quartz substrate.

After deposition, the substrate was heated in an electric furnace at 300° C. for one hour in order to enhance the growth of the respective semiconductor microcrystallites of CuCl or $CdS_xSe_{1-x}$. The CuCl content in the amorphous thin film was found to be 20 weight % and the size of microcrystallites was measured to be in the range of 4 to 6 nm after this heat treatment. When $CdS_xSe_{1-x}$ was used as the dopant, the of $CdS_xSe_{1-x}$ content in the amorphous thin film was found to be 18 weight % and the size of microcrystallites measured to be in the range of 5 to 9 nm.

Under these deposition conditions, the optical bandgap of undoped silicon nitride is about 5 eV (from an optical absorption spectrum of silicon nitride), whereas the optical bandgaps for the CuCl and $CdS_xSe_{1-x}$ semiconductor thin films are 3.2 eV and 2.5 eV respectively (values nearly equal to those of their respective bulk materials). As evident, the optical bandgap of undoped silicon nitride is larger than the optical bandgap of the CuCl or $CdS_xSe_{1-x}$ semiconductors.

The values of the bandgap for silicon nitride films doped with CuCl or $CdS_xSe_{1-x}$ semiconductor microcrystallites derived from their absorption spectra were found to be blue-shifted by 0.4 and 0.35 eV respectively, to values of 3.6 eV for CuCl-doped silicon nitride and 2.85 eV for $CdS_xSe_{1-x}$-doped silicon nitride. This blue shift indicates that the semiconductor material is dispersed in the thin film as quantum dots, the presence of which generally indicates that the doped thin film is capable of exhibiting bistable optical behavior.

In this second embodiment, although only the deposition of silicon nitride doped with semiconductor microcrystallites has been specifically described herein experiments were also conducted in which other amorphous thin film materials, including boron nitride, aluminum nitride, and titanium nitride were doped with semiconductor microcrystallites. Blue shifts in the bandgaps of those semiconductor doped materials caused by the incorporation of the semiconductor into the amorphous thin films were observed in these cases as well.

Further, although nitrogen gas ($N_2$) was used to form a silicon nitride amorphous thin film in this second embodiment, ammonia or other nitrogen containing gases can be used as well.

Embodiment -3

A layer of silicon carbide amorphous thin film was deposited on a substrate by utilizing the reaction between a silicon target 2 and a hydrocarbon gas introduced into the sputtering chamber 6. During sputter deposition, semiconductor microcrystallites were doped into the growing carbide layer by simultaneously sputtering a semiconductor target 1 to form a semiconductor-doped silicon carbide amorphous thin film.

In this third exemplary embodiment, the sputtering gas 7 may be a mixture of methane ($CH_4$) and argon gas, respectively maintained at pressures of 3 Pa and 2 Pa during the sputtering process. The group III–V compound semiconductor GaAs and the group II–VI compound semiconductor CdTe were alternatively used as the semiconductor target 1 in this case. High-frequency powers of 40 watts and 250 watts were respectively supplied to targets 1 and 2 to form a 20 micron thick thin film doped with either GaAs or CdTe semiconductor microcrystallites on a 0.5 mm thick quartz substrate.

After deposition, the substrate was heated in an electric furnace at 300° C. for one hour in order to enhance the crystal growth of the semiconductor microcrystallites of GaAs or CdTe. The GaAs content in the amorphous thin film was found to be 20 weight % and the size of the GaAs microcrystallites measured to be in the range 4 to 6 nm after this heat treatment. When CdTe was used as the material for target 1, the CdTe content in the amorphous thin film was found to be 24 weight % and the size of the CdTe microcrystallites measured to be in the range of 5 to 9 nm.

The optical bandgap of undoped silicon carbide is determined to be 2.5 eV from its optical absorption spectrum. The optical bandgaps of thin films of GaAs and CdTe are 1.4 eV and 1.5 eV respectively (values nearly equal to those of their respective bulk semiconductor materials). Note that the optical bandgap of undoped silicon carbide is larger than that of the GaAs and CdTe semiconductors.

However, the values of the bandgaps (derived from optical absorption spectra) of silicon carbide films doped with either GaAs or CdTe semiconductor microcrystallites were found to be blue-shifted by 0.5 and 0.4 eV respectively to 1.9 eV for the GaAs-doped silicon carbide and 1.9 eV for CdTe-doped silicon carbide. The blue shift indicates that the semiconductor material is dispersed in the form of quantum dots and capable of exhibiting bistable optical characteristics.

In this third embodiment wherein silicon carbide is used as the amorphous thin film, doping experiments were also conducted for the case of other group II–VI compound semiconductors such as CdSe, ZnTe, HgTe, HgCdTe; other group III–V compound semiconductors such as, InAs, InP, InSb, GaAlAs, InAlAs; and group IV semiconductors such as Si and Ge.

Blue shifts in the optical bandgaps indicative of bistable optical characteristics were also observed when amorphous thin films of boron carbide or titanium carbide were doped with semiconductor microcrystallites.

Further, although methane gas ($CH_4$) was used to form the silicon carbide amorphous thin film in this embodiment, ethane ($C_2H_6$) or other carbon-containing gases may be used as well.

Embodiment-4

Optical bistable devices were prepared by fabricating CuCl or $CdS_xSe_{1-x}$ (x=0.1) doped silicon carbide amorphous thin film materials according to the method described with respect to Embodiments 1 or 2.

Figure 2:
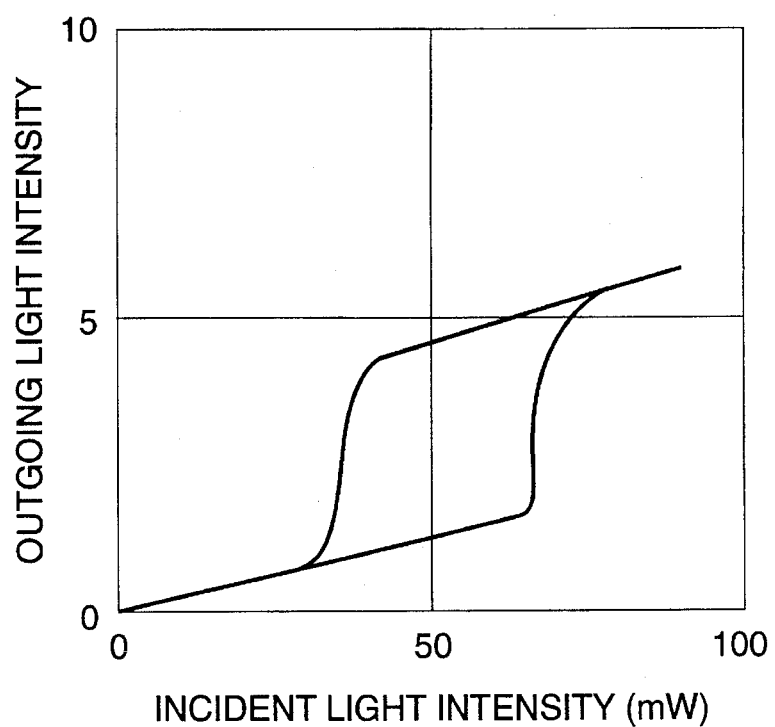
FIG. 2 shows the optical characteristics of an optical bistable device formed from a nonlinear optical material disclosed herein and manufactured by the sputtering apparatus shown in FIG. 1.

FIG. 2 shows a typical bistable optical characteristic of materials prepared in this manner. Incident and outgoing light intensities were measured at 25° C. by introducing a 530 nm light beam (produced with an $N_2$ laser pumped dye-laser) having a spot diameter of 4 µm onto the thin film device from its quartz substrate side.

Embodiment-5

Optical bistable devices have also been prepared by fabricating GaAs or CdTe doped silicon carbide amorphous thin films in accordance with the method shown in Embodiment 3.

When a 600 nm light beam (produced with an $N_2$ laser pumped dye-laser) having a spot diameter of 5 µm is incident on such optical bistable devices from the quartz substrate side, a bistable characteristic similar to the one shown in FIG. 2 was observed in the relationship between the incident and outgoing light intensities at 25° C.

Although the above embodiments include a post-deposition heating step to further the growth of the semiconductor microcrystallites, it should be noted that the sputtering process results in sputtered atoms or molecules which have significantly higher energies than those produced by thermal evaporation techniques. Therefore, when the sputtered atoms and molecules deposit on the substrate, they have sufficient mobility to migrate along the substrate and nucleate into microcrystallites, without any additional heat treatment. Therefore, in some cases, the post-deposition heating step may not be necessary.

Although the invention disclosed herein has been described with reference to various exemplary embodiments, it is to be understood that these embodiments are merely illustrative of the various aspects and features of the invention. As such, it may be obvious to a person skilled in the art to make numerous modifications to the illustrative embodiments described herein. However, such modifications and other arrangements which may be devised to implement the invention should be considered as coming within the spirit and scope of the invention as claimed.

What is claimed is:

1. A non-linear optical device comprising a transparent substrate and a thin film formed thereon, said thin film having (1) an amorphous layer selected from the group consisting of nitrides and carbides; and (2) semiconductor crystallites having a size less than about 10 nanometers dispersed within said amorphous layer wherein said semiconductor crystallites are about 20 weight percent of said thin film, said device exhibiting non-linear optical properties.

2. A non-linear optical device comprising a transparent substrate and a thin film formed thereon, said thin film having an amorphous carbide layer and semiconductor crystallites having a size less than about 10 nanometers dispersed within said amorphous layer, wherein said semiconductor crystallites are about 20 weight percent of said thin film, said device exhibiting non-linear optical properties.

3. A non-linear optical device comprising a transparent substrate and a thin film formed thereon, said thin film including an amorphous boron carbide layer and semiconductor crystallites having a size less than 10 nanometers dispersed within said amorphous boron carbide layer, said device exhibiting non-linear optical properties.

4. A non-linear optical device comprising a transparent substrate and a thin film formed thereon, said thin film including an amorphous aluminum carbide layer and semiconductor crystallites having a size less than about 10 nanometers dispersed within said amorphous aluminum carbide layer, said device exhibiting non-linear optical properties.

5. A non-linear optical device comprising a transparent substrate and a thin film formed thereon, said thin film including an amorphous titanium carbide layer and semiconductor crystallites having a size less than about 10 nanometers dispersed within said amorphous titanium carbide layer, said device exhibiting non-linear optical properties.

6. A device that exhibits non-linear optical properties comprising a thin film having an amorphous nitride layer and semiconductor crystallites dispersed within said amorphous nitride layer.

7. A device in accordance with claim 6 wherein said amorphous nitride layer is selected from the group consisting of boron nitride, aluminum nitride, titanium nitride and silicon nitride.

8. A device in accordance with claim 6 wherein the optical bandgap of said amorphous nitride layer is greater than the optical bandgap of said semiconductor crystallites.

* * * * *